July 9, 1940.  W. LENK  2,207,592
DETECTING MAGNETIC PARTICLES IN NONMAGNETIC MATERIALS
Filed March 20, 1939
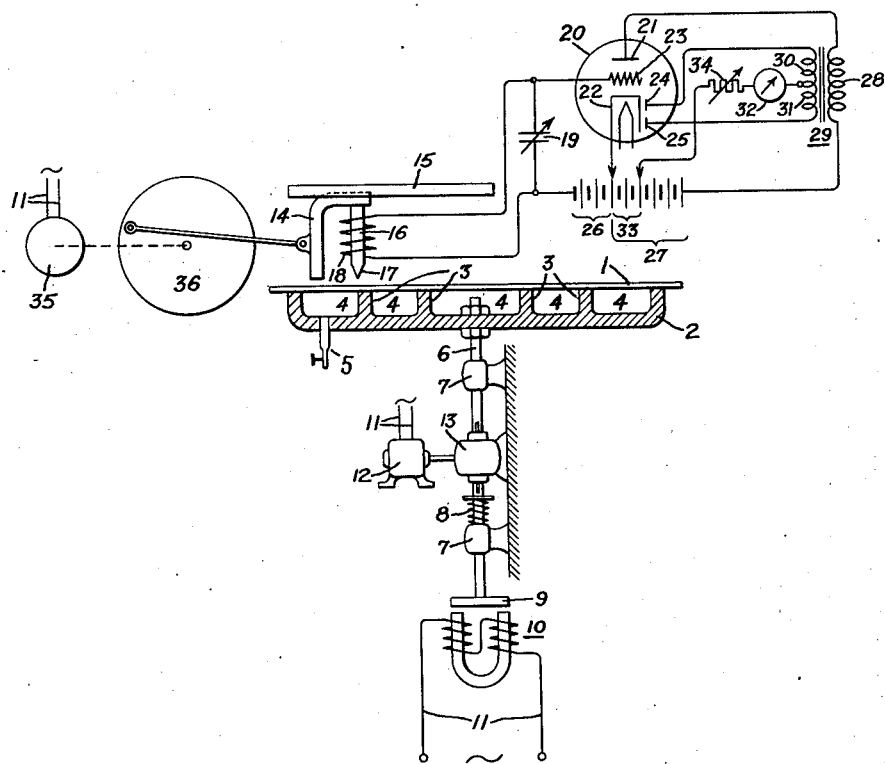
Inventor:
Wilhelm Lenk,
by Harry E. Dunham
His Attorney.

Patented July 9, 1940

2,207,592

UNITED STATES PATENT OFFICE 2,207,592

DETECTING MAGNETIC PARTICLES IN NONMAGNETIC MATERIALS

Wilhelm Lenk, Bad Neustadt, Saale Unterfranken, Germany, assignor to General Electric Company, a corporation of New York Application March 20, 1939, Serial No. 263,020
In Germany March 28, 1938

7 Claims. (Cl. 175—183)

This invention relates to the art of magnetic testing and concerns particularly a method of and apparatus for detecting the presence of iron or other magnetic particles in nonmagnetic materials.

A general object of my invention is the provision of an improved method of detecting the presence of iron or other magnetic particles in materials such as paper, glass, mica, aluminum, and other non-magnetic substances. Another object of my invention is the provision of apparatus for testing nonmagnetic materials of either metallic or nonmetallic character which will be positive and sensitive in operation and with which the presence of magnetic particles may be made quickly and easily. Other and further objects will become apparent as the description proceeds.

In accordance with my invention in its preferred form and in its broadest aspect, I subject the material under test to a uni-directional magnetic field and support the body or specimen under test in this magnetic field in such a manner that rapid relative movement may take place between the field producing member and the test specimen. The presence of magnetic particles in that portion of the test specimen which is subjected to the influence of the magnetic field is manifested by a variation in the reluctance of the material under test. This in turn results in a corresponding change in the number of lines of force in the magnetic circuit. I provide means responsive to the rate of change of these lines of force to give an indication of the presence of magnetic particles.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, in which one form of apparatus is illustrated, partly in cross-section, which may be employed in carrying out my invention.

Referring now more in detail to the drawing, for the purpose of illustrating the principles of my invention I have shown a body 1 of nonmagnetic material which may represent a meter disk in which it is desired to detect the presence of iron or other magnetic particles which may have penetrated the softer metal during the manufacturing process. The numeral 2 designates a cross-sectional view of a supporting member generally in the form of a pan or dish having interior projections or raised portions 3 which form recesses 4 when the body or test specimen 1 is placed in position as shown in the drawing. The member 2 may be constituted by some nonmagnetic material, such as a rubber composition. An inlet 5 to the recesses 4 is adapted for connection to a suction device (not shown) to provide convenient means for drawing the test body 1 against the rim portion of the body 2 and the projections 3. However, any suitable means for holding the test specimen in position on the supporting member will suffice. The member 2 is connected at its central portion with a vertical shaft 6 which is mounted in bearing members 7 to permit rotation. A helical spring 8 provides means for overcoming the weight of the apparatus to hold the member 2 normally in a given vertical position. The lower end of the shaft 6 is provided with a circular disk-shaped armature 9 which co-operates with an electro-magnet 10 to rapidly vibrate the shaft 6 and supporting means 2 with a reciprocating motion in a vertical direction. The magnet 10 is excited by an alternating current source of supply 11 of the usual commercial frequency, and is preferably located a sufficient distance from the measuring circuit to avoid interference therewith.

In order to be able to test the body 1 at all points at a given radius from its central portion I employ means including an electric motor 12 which is adapted to rotate the shaft 6 at a low speed through a gear reduction device 13. As will be understood the gear reduction device 13 or other suitable speed reducing means is adapted to permit the shaft 6 to reciprocate with respect thereto in a vertical direction.

A permanent magnet or electromagnet 14 adapted to be supported by and moved in a guideway 15 or other suitable arrangement is provided with a pole piece 16 which may be of soft iron is positioned in close proximity to the body under test to subject the latter to a uni-directional magnetic field. The end portion 17 of the pole piece 16 may be chisel shaped, pointed, or simply a plain surface as desired, depending upon the type of defect likely to be encountered. For example, small splinters or iron may best be detected by a pointed pole, while it may be better to employ a pole piece having a flat face where uniformly distributed quantities of iron are likely to exist. Also the spacing of the magnet and pole piece may be altered to obtain the desired results under various testing conditions.

The uni-directional lines of force produced by the magnet 14 will be uniform so long as there is no magnetic material present in the body 1 in the immediate vicinity adjacent the magnet and pole tip 17. However, if magnetic particles are present in this vicinity the permeability will be greater with the result that the lines of force will be increased, and if the body 1 is reciprocated back and forth in a vertical direction in the presence of the magnetic field, an alternating component of flux will be set up in the core 16. In order to detect the rate of change of the total flux in the core 16 caused by the presence of magnetic particles, I employ a detecting or exploring coil 18 which is wound about the core 16. I connect a condenser 19 across this coil and adjust the reactance values of the elements 18 and 19 so that they are in resonance with the frequency of oscillation or vibration of the test specimen 1. In this way the sensitivity of the indications is greatly increased and the device is rendered free from external disturbances. The circuit including the detector winding 18 and condenser 19 is connected with the input circuit of an electron discharge device 20, which for convenience may be of the duplex-diode-triode type and which provides amplification and rectification of the input current. The electron discharge device 20 is provided with an anode 21, an indirectly heated cathode 22, a control electrode 23 and auxiliary anodes 24 and 25. A source of direct current 26 is provided to maintain the desired biasing potential on the control electrode 23.

The anode 21 of the amplifier is connected in series with a source of direct current 27, and the primary winding 28 of a transformer 29. The source of direct current 27 produces a continuous flow of current through the anode circuit of the amplifier and this flow of current is adapted to be varied in accordance with the alternating current voltage induced in the detector coil 18. The secondary winding of the transformer 29 is divided into two similar sections 30 and 31 and these sections are differentially connected with the rectifying portion of the amplifier 20 including the cathode 22 and the auxiliary anodes 24 and 25. A direct current indicating instrument 32 of any suitable type is connected between the cathode 22 and the junction of the winding sections 30 and 31 in series with a source of direct current 33 and an adjustable resistance 34. By means of the voltage source 33 the instrument 32 may be adjusted to give a zero indication of current in those instances where it is desired to ascertain or reject, as the case may be, only those specimens in which magnetic-particles are present beyond a fixed percentage or amount. This voltage source also provides means for stabilizing the current indicating means 32 thus avoiding any tendency of its zero to wander over the scale. The variable resistance element 34 provides suitable means for adjusting the sensitivity of the device to the desired value.

In order to be able to test the body 1 over its whole surface, I provide an electric motor or other suitable device 35 which is adapted to drive a reciprocating device 36. The device 36 is connected to move the magnet 14 slowly back and forth in a radial direction adjacent the surface of the body under test. Inasmuch as the driving device 12 provides means for rotating the body 1, its whole surface may be subjected to the magnetic field produced by the magnet 14. The speeds of rotation of the driving devices 12—13 and 35—36 are preferably selected at a low value and are preferably so coordinated that the magnet 14 moves a small amount for each revolution of the test specimen in a manner analogous to the movement of a phonograph needle across the surface of a record. By virtue of the coordination of the rapid oscillations or vibrations of the test specimen produced by the driving device 10, the slow radial movement of the exploring coil, and the correspondingly slow rotational movement of the test specimen, I have provided an effective device for testing normally non-magnetic bodies for the presence of magnetic particles or material, and by observing the indications of the measuring instrument 32 the position of the defect in the material may be accurately determined. In certain cases, however, it may be sufficient merely to know whether the material is defective and in such situations the location of the defect may be unimportant.

In operation the test specimen or body is placed in position on the supporting member 2, and the suction is applied to the inlet 5 to hold the member 1 firmly in position. The electromagnet 10 is excited and the shaft 6 is thereby oscillated or vibrated in a vertical direction to move the member 1 back and forth in the presence of the permanent magnet 14 and pole piece 16. In the event that magnetic material is present in that portion of the body 1 which is subjected to the magnetic field produced by the permanent magnet 14, an alternating flux will be set up in the core 16 proportional to the rate of change in the reluctance of the magnetic circuit including the magnetic particles. As a result a corresponding alternating voltage will be induced in the detector coil 18, which is amplified and then measured by means of the indicating instrument 32. During the testing operation the motors 12 and 35 are also energized to provide rotation of the test specimen 1 and movement of the electromagnet 14 back and forth in a radial direction about the surface of the body 1, respectively. In this way all portions of the body 1 are successively brought under observation for the detection of any magnetic particles which may be present.

In some cases it may be found desirable to operate the apparatus of my invention without the use of the driving member 10. When the apparatus is so operated the test specimen is supported adjacent the magnetic field producing member 14, as shown, or in any other convenient manner, and the magnet and exploring coil are moved over the surface of the test specimen by the apparatus shown or other suitable means at a sufficiently rapid rate to produce deflections of the indicating instrument when magnetic particles are present in the vicinity of the poles of the magnet. It will also be evident that the magnetic detector may be used as a portable device by manually moving the detector, including the field producing member and the exploring coil, over the surface of the test specimen at a sufficiently rapid rate and watching for any deflection of the indicating instrument. When so used it may be found desirable to mount the field producing member and exploring coil on rollers or other suitable means to provide a uniform gap between the magnet poles and the test specimen, although this is not necessary for the successful operation of the device.

While I have illustrated and described my invention as employed for testing normally non-magnetic materials, such as a meter disk, my invention is not limited to such use but this merely represents one of numerous useful fields of application. It may obviously be employed for detecting the presence of magnetic particles in various kinds of nonmagnetic materials of metallic or nonmetallic character in sheet, strip, or disk form, and the like, and may be found particularly useful in those cases where the material in sheet form is moved continuously by a conveyor system. In such situations, if desired, the magnet may be oscillated or vibrated instead of the strip or, depending upon the speed of the moving strip, it may be sufficient to allow the magnet to remain stationary. In any case it is merely necessary that there be sufficiently rapid relative movement between the field producing member and the test specimen to produce a deflection of the indicating instrument when magnetic particles are present. The particular amplifier and indicating circuit is for the purpose of illustration only except in so far as it includes a circuit in which the exploring coil is tuned to resonate at the frequency of oscillation or vibration of the field producing member or the test specimen, as the case may be. Such other modifications as fall fairly within the true spirit and scope of the invention are intended to be included within the scope of the appended claims.

What I claim as new and desire to secure by Letters Patent of the United States is:

1. The method of testing nonmagnetic materials to detect the presence of magnetic particles, which comprises subjecting the material to be tested to the direct influence of a unidirectional magnetic field, producing a rapid relative reciprocating movement between the material and the magnetic field to produce a corresponding variation in the spacing between the source of the magnetic field and the material to be tested, producing relative movement between the material and the magnetic field whereby all portions of the material may be successively brought within the influence of the magnetic field, and observing any rate of change in the number of lines of force in the magnetic field due to variations in permeability caused by the presence of magnetic particles in the material under test.

2. A device for detecting the presence of magnetic particles in nonmagnetic bodies, comprising means for producing a unidirectional magnetic field, means for positioning a body to be tested in said magnetic field adjacent the field producing means, means for producing rapid relative reciprocating movement between the field producing means and the body to be tested to produce a corresponding variation in the spacing between the field producing means and the body to be tested, means for relatively moving the body to be tested, means for relatively moving the field producing means and the body to be tested whereby all portions of said body may be subjected to the magnetic field, and means for detecting changes in the permeability of the material to be tested.

3. A device for detecting the presence of magnetic particles in nonmagnetic materials, comprising means for producing a unidirectional magnetic field, means for positioning a body to be tested in the magnetic field adjacent the field producing means, means for producing rapid relative reciprocating movement between the field producing means and the body to be tested to produce a corresponding variation in the spacing between the field producing means and the body to be tested, means for relatively moving the field producing means and the body to be tested for successively subjecting different portions of said body to the magnetic field, and means associated with the field producing means for deriving a voltage proportional to the rate of change in the total magnetic flux produced by said field producing means.

4. In a device for detecting the presence of magnetic particles in nonmagnetic bodies, means for producing a unidirectional magnetic field, means for subjecting the body to be tested to the direct influence of the magnetic field, means for producing relative reciprocating movement between the body under test and the field producing means, a coil positioned in said magnetic field and responsive only to pulsations in the total flux produced by said unidirectional field producing means, a circuit including the coil and tuned to resonance at the frequency of said relative movement only when a magnetic particle is present in said nonmagnetic body and within the influence of said magnetic field, and a current detecting device associated with said circuit.

5. In a device for detecting the presence of magnet particles in nonmagnetic bodies, means for producing a unidirectional magnetic field, a rotatable and axially movable support for the body to be tested, means for vibrating the support in the presence of and relative to the magnetic field, means for rotating the support, and means for detecting the rate of change in the magnetic field due to variations in the permeability of the body to be tested.

6. In a device for detecting the presence of magnetic particles in nonmagnetic bodies, means for producing a unidirectional magnetic field, a vertically movable support for the body to be tested, means for vibrating said support in the presence of and relative to said magnetic field, means for relatively moving said material and said field producing means to subject all portions of said material to said magnetic field, and means for detecting variations in the permeability of the material to be tested.

7. In a device for detecting the presence of magnetic particles in nonmagnetic bodies, means for producing a unidirectional magnetic field, means for positioning a body to be tested in a substantially horizontal plane and within the influence of said magnetic field, means for producing rapid relative reciprocating movement in a substantially vertical direction between the field producing means and the body to be tested field producing means and the body to be tested to vary the spacing between said field producing means and said body, means for producing relative movement of said field producing means and the body to be tested whereby all portions of said body are subjected to said magnetic field, and means for detecting variations in the total flux produced by said unidirectional field producing member.

WILHELM LENK.